United States Patent [19]

Zacharie

[11] 4,204,222

[45] May 20, 1980

[54] HIGH OUTPUT LED MATRIX COLOR TV SCREEN WITH VERTICAL TRIAD AND TRICOLOR FACEPLATE

[76] Inventor: Antoine Zacharie, C.P. 100, 74 Rue Zacharie, Sacre-Couer, Saguenay, Quebec, Canada, G0T 1Y0

[21] Appl. No.: 916,712

[22] Filed: Jun. 19, 1978

[51] Int. Cl.$^2$ ............................................. H04N 9/30
[52] U.S. Cl. ..................................................... 358/59
[58] Field of Search ............... 358/59, 241; 315/169.1, 315/169.2, 169.3; 313/500; 340/762, 782

[56] References Cited

U.S. PATENT DOCUMENTS

| | | | |
|---|---|---|---|
| 2,615,087 | 10/1952 | Rines | 358/66 |
| 3,631,251 | 12/1971 | Lehovel | 315/169.1 |
| 3,935,590 | 1/1976 | Kaji et al. | 358/59 |

FOREIGN PATENT DOCUMENTS

| | | | |
|---|---|---|---|
| 933287 | 9/1973 | Canada . | |
| 1817307 | 8/1969 | Fed. Rep. of Germany | 313/500 |
| 1148914 | 12/1957 | France | 358/44 |

OTHER PUBLICATIONS

IBM Technical Disclosure Bulletin, "Electroluminescent Diodes and Arrays," J. C. Marinace et al., vol. 8, No. 11, Apr. 1966.

Primary Examiner—George G. Stellar
Attorney, Agent, or Firm—Michael M. Sakovich

[57] ABSTRACT

Visual display apparatus having conductors arranged in a matrix forming a plurality of crosspoints includes an improved light-emitting diode connected across each crosspoint. The diodes are electrically energizable via the matrix to form an image and individual ones of the diodes are positioned relative to their respective crosspoints so that every light-emitting diode junction is provided an unobstructed path for its emitted light. An embodiment for colored image displays includes a shadow mask overlying the matrix with apertures in the mask aligned in registry with the diodes to direct the light outwardly of the matrix. Three transparent lamina overlie the mask and each lamina carries a predetermined array of photon activated fluorescent material that emits light having one of the additive primary colors of red, green and blue. The combined array of fluorescent material forms a plurality of color triads corresponding to crosspoint triads which are energized by horizontal and vertical scan means to provide a resulting scan that consecutively energizes all the crosspoints in a predetermined order.

6 Claims, 13 Drawing Figures

HIGH OUTPUT LED MATRIX COLOR TV SCREEN WITH VERTICAL TRIAD AND TRICOLOR FACEPLATE

BACKGROUND OF THE INVENTION

This invention relates to image reproduction apparatus and more particularly to such apparatus that is substantially flat in form and which includes solid state devices for reproducing the image.

Cathode-ray tubes (CRT) are well known in the art of video image reproduction and are recognized as an industry standard in the application of a picture reproduction element of a television receiver. It is noted that the popularity of the CRT persists notwithstanding the fact that current developments in the television industry have evolved receivers which employ solid state devices throughout except for reproducing an image. The conventional solid state television receiver therefore becomes a hybrid device in which all drive circuits that operate the picture tube are solid state devices whereas the image reproducing element of the receiver is a hard vacuum tube.

Many advantages would naturally accrue through the use of a solid state picture tube. Perhaps the most notable advantage would be the increased compatibility of the solid state drive circuitry with a solid state picture tube. In this connection, it is noted that television receivers are relatively bulky devices for their picture size which arises as a result of deflection requirements for scanning a conventional CRT. As a result of wider deflection angles, the length of the CRT has been reduced and in this way the cabinet depth of a television receiver has been made correspondingly smaller. There is, however, an apparent need to still further reduce cabinet sizes in order to provide relatively large reproduced images without incurring the disadvantage of requiring considerable cabinet depth to support the CRT. It would therefore be extremely useful to have a compatible solid state picture tube that is substantially flat in form in order to reduce the space requirements of the conventional television receiver. A flat picture tube would therefore permit fabrication of a television receiver as a wall mounting apparatus requiring little more space than a framed picture.

Increased compatibility carries with it additional features that would result in improved operation of the picture tube with reduced hazards. For example, a solid state picture tube of the type proposed herein would not require a large evacuated glass envelope that carries with it certain hazards. One of the more serious hazards, of course, is the danger of implosion as a result of the vacuum pressure within the envelope.

Other advantages result in more simple receiver circuitry and improved operation as a consequence. Thus, high second anode voltages would no longer be required, together with corresponding scanning circuitry, dynamic convergence coils, focus circuits and the like. The effect of poor stability in any of these circuits would result in a degraded picture which can be avoided with the flat picture tube.

As a result of avoiding high voltage second anode voltages, X-radiation is reduced together with its attendant hazards thus providing still another advantage.

SUMMARY OF THE INVENTION

According to one aspect of the invention, means are provided to reproduce an image in a solid state picture tube that does not require a high second anode voltage of the order of 24 KV.

Another aspect of the invention provides a solid state picture tube having a matrix arrangement of spaced horizontal and vertical parallel conductors having light-emitting diodes disposed at each crosspoint junction.

Another provision of the invention is logic scanning of the picture tube which does not require a convergence system, or focus circuits.

Still another provision of the invention is a substantially flat picture tube of laminar construction which does not require an evacuated envelope to enclose the inner structure.

Still another provision of the invention is a solid state picture tube of laminar structure which is readily adapted to reproduce either monochrome or colour images.

The invention also provides a solid state colour picture tube having overlying transparent lamina each carrying a photon activated fluorescent material adapted to emit additive primary colours of red, green and blue.

The disadvantages associated with picture tubes of the prior art may be substantially overcome and the foregoing provisions achieved by recourse to a digital scanning colour television video screen having a plurality of conductors arranged in a matrix forming a plurality of crosspoints with each crosspoint including a separate source of light energizable via the matrix to form an image. The screen comprises a plurality of horizontal conductors arranged in groups of three conductors each, the groups being disposed vertically across the screen in uniformly spaced relation with each group corresponding to a single horizontal scan line, a plurality of vertical conductors disposed horizontally across the screen in uniformly spaced relation to form the matrix, the intersection of the conductors of each horizontal scan line with a single vertical conductor forming a vertically disposed plurality of crosspoint triads, light-emitting diode means connected across each crosspoint, each of such means having a junction that is energizable via the matrix to emit white light and which is disposed relative to its crosspoint to provide an unobstructed path for incident light emitted by the junction, and tricolour faceplate means having disposed thereon a plurality of colour triads corresponding to the crosspoint triads and aligned in overlying registry therewith.

DESCRIPTION OF THE DRAWINGS

The invention will now be more particularly described with reference to embodiments thereof shown, by way of example, in the accompanying drawings wherein.

DESCRIPTION OF THE ILLUSTRATED EMBODIMENTS

Figure 1:
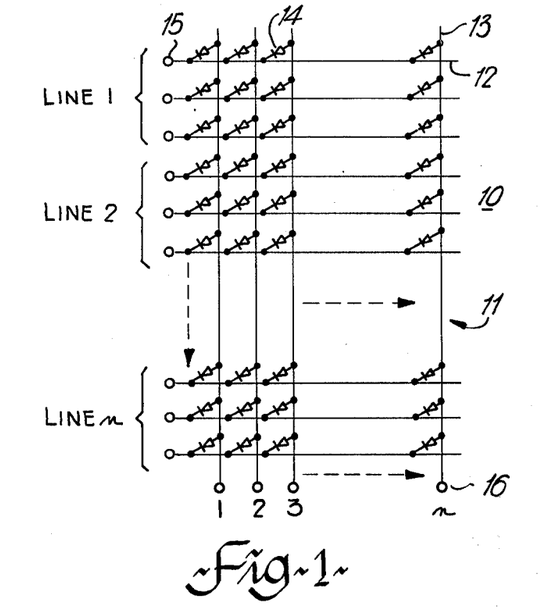
FIG. 1 is a schematic diagram of a solid state picture tube indicating a matrix arrangement of horizontal and vertical conductors forming a plurality of crosspoints, each of which is provided with a light-emitting diode (LED)

Referring now to the drawings, FIG. 1 illustrates a schematic diagram of a solid state picture tube 10 that includes a matrix 11 which comprises a plurality of horizontal conductors 12 and vertical conductors 13. It will be observed that each crosspoint of the conductors 12 and 13 has joined thereacross a light-emitting diode (LED) 14. Individual ones or predetermined combinations of the diodes 14 may be energized by the application of suitable voltages to horizontal terminals 15 and to vertical terminals 16 to produce an image.

It will be observed that FIG. 1 is only a partial schematic diagram of the matrix 11 and has been presented in this manner in order to show a more simple view. The embodiment illustrated is a matrix 11 that is adapted for use as a colour type solid state picture tube. In this respect, individual scanning lines of the tube are formed by the horizontal conductors 12 arranged in groups of three. It will be seen that starting from the top of the figure the first three conductors 12 comprise the first scanning line indicated as line 1 and that the next three conductors 12 comprise the second scanning line indicated as line 2. The last three conductors 12 indicate the last scanning line shown as line n.

To those skilled in the art it will be apparent that the matrix 11 may also be used for monochromatic image reproduction as in conventional black and white television receivers simply by using one-third of the horizontal conductors 12 shown. Thus, each horizontal scanning line would comprise one horizontal conductor 12.

In order to energize any one of the diodes 14, corresponding ones of the conductors 12 and 13 must be selected and energized with a suitable potential to generate light at the junction of the diode.

Figure 3:
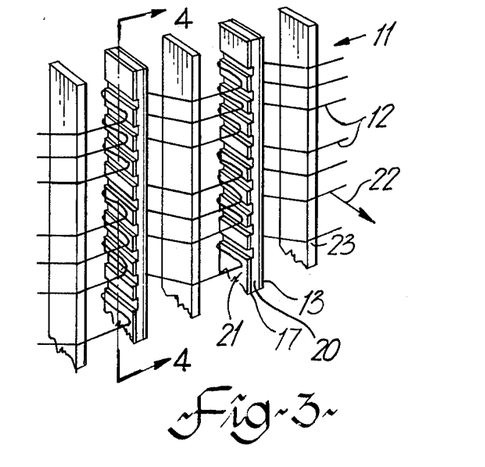
FIG. 3 is a perspective view showing a portion of one embodiment of the matrix indicated in FIGS. 1 and 2.

Since light is principally generated in the immediate vicinity of the junction, it is important that the crosspoint formed by the conductors 12 and 13 be positioned in a way that the conductors do not act to block the passage of incident light generated by the diode. FIG. 3 illustrates another embodiment of the invention and indicates a manner of matrix construction that avoids this problem.

The matrix 11 of FIG. 3 provides an improved LED light source at each crosspoint. The improvement occurs as a result of the particular construction employed wherein conductors 12 and 13 are disposed behind the junction portion of the diode which emits light. Close inspection of FIG. 3 reveals that the vertical conductors 13 are in the form of strips separated by insulating strips 23 and that on one side of each conductor 13 there are P and N layers of semiconductor material that form a diode having a light-emitting junction 17. A clearer representation of this structural feature may be seen in FIG. 4 which is a longitudinal sectional view of a vertical conductor 13 shown in FIG. 3. An N layer 20 of semiconductor material is disposed on one side of the vertical conductor 13. In overlying relation with the N layer 20 is a P layer 21 which may be formed by known methods of diffusion. The manner of forming the light-emitting junction and, for that matter, the respective positions of the N and P layers is not critical insofar as the invention is concerned and any suitable method known in the art may be employed for this purpose.

FIG. 3 illustrates that the horizontal conductors 12 are arranged in a woven relationship with the vertical conductors 13 together with the layers 20 and 21. This form of construction appears to be well suited to automated processes and may be fabricated in the form of a woven fabric. In this particular instance, the horizontal conductors 12 are circular in cross section and are affixed to one layer of the semiconductor material in the manner indicated in FIGS. 3 and 4. Although not shown, a bond may be formed between the conductor 12 and its corresponding contacting portion of the semiconductor material by means of ultrasonic welding. In the event that an adequate contact pressure may be generated and maintained in the structure indicated, then no physical bonding is required, the presence of the contact pressure being adequate to maintain the conductor 12 in good electrical contact with the semiconductor layer 20 or 21.

An arrow 22 in FIG. 3 indicates the direction of light generated at a junction 17 and propagated outwardly from the matrix 11. It will be observed that neither the conductors 12 or 13 impede the incident light generated by the junction since both conductors are disposed in such a way as to provide an unobstructed view of the exposed light-emitting edge of the layers 20 and 21. In this regard, it will be noted that each conductor 12 contacts the semiconductor layer 21 and is then disposed in insulating relation around the other edge of the junction 17, which is the rearward edge, and the exposed side of the vertical conductor 13 so as to provide the unobstructed view of the junction 17.

The matrix 11 shown in FIG. 3 may also be fabricated in accordance with known chemical milling techniques. The vertical conductors may initially be fabricated as a lamina of conductive material upon which is disposed the P and N layers to form a continuous junction 17. Thereafter, the horizontal conductors 12 may be disposed as a uniform conductive lamina over the layers 20 and 21. Ink resist is then applied to both conductive surfaces in order to mask out individual conductors following which a chemical milling treatment is applied to etch away the unwanted portions of the conductive material, thereby defining individual ones of conductors 12 and 13.

Figure 4:
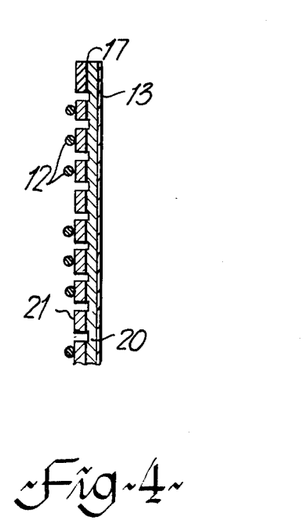
FIG. 4 is a sectional view taken along the lines 4—4 of FIG. 3.

In the next step, the junction 17 at each crosspoint may be accurately defined and isolated to prevent unwanted illumination when adjacent crosspoints are energized. This is indicated in the sectional view of FIG. 4. A chemical milling process may again be used to serrate the layers 20 and 21 to a point below the LED junction 17 as shown in FIG. 4.

Following fabrication of the matrix 11 as above described, each vertical conductor 13 is rotated through 90° in order to achieve the structural configuration of FIG. 3. Between each pair of conductors 13 there is inserted an insulating strip 23 which electrically isolates the adjacent pairs of vertical conductors 13.

Figure 2:
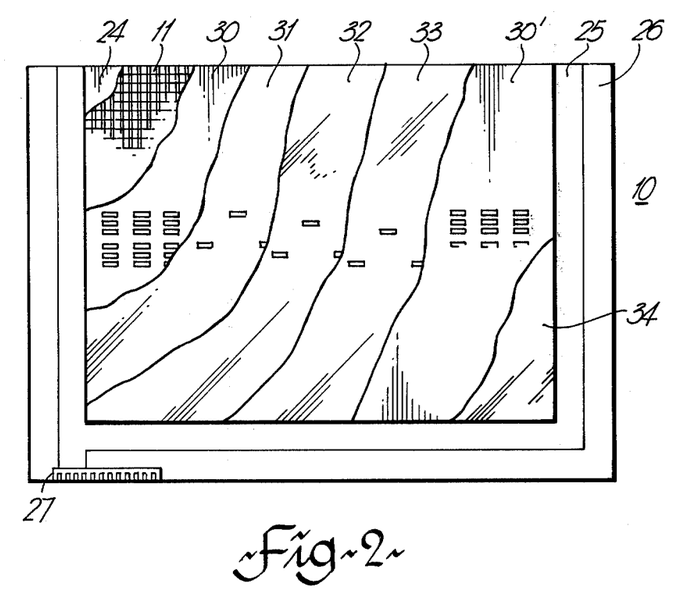
FIG. 2 is a front elevation view of a solid state picture tube fabricated in accordance with principles of the present invention with portions broken away to show a laminar structure.

Following fabrication of the matrix 11 the matrix may be mounted on a ceramic or glass substrate 24 preparatory to final assembly of the semiconductor picture tube 10 shown in FIG. 2.

FIG. 2 illustrates the laminar structure of the tube 10. The matrix 11 has been described as overlying the substrate 24. In the illustration of FIG. 2, the substrate 24 may be arranged to define the outer limits of the tube 10 and may be particularly adapted to carry all of the logical drive circuitry necessary to operate the tube. Thus, a generally U-shaped portion 25 may be reserved for required scanning circuitry in large scale integrated (LSI) form. An outermost U-shaped area 26 is unused and merely acts as an insulating boundary between the strip 25 and the outermost edge of the tube 10. Alternatively, the area 26 may be adapted to mount a majority of the components of a television receiver as well. It will be noted that the strip 25 is connected to an electrical connector 27 through which the LSI circuitry obtains signal and operating voltages.

The laminar structure of the tube 10 is clearly apparent since portions of each lamina are broken away to expose the next underlying lamina. Starting with the lowermost lamina, the substrate 24, it may be seen that the matrix 11 is disposed thereon. Overlying the matrix 11 is a shadow mask 30. The form of the shadow mask 30 may be seen in FIG. 5 which illustrates a front elevation view of a portion thereof and indicates the general arrangement of openings in the mask which permit the unobstructed passage of light generated by an LED at each crosspoint. Individual ones of the apertures are necessarily aligned in registry with a corresponding light source to direct the light therefrom outwardly of the matrix to a viewer. While the shadow mask structure indicated in FIG. 5 is particularly adapted for use in a colour type picture tube, it will be apparent to those skilled in the art that a similar arrangement may be used for a monochromatic picture tube.

It should be noted that the various dimensions of the structures illustrated together with spacings thereof are not to be taken as being drawn to scale. The various dimensions of the components of each structure have been chosen in order to best illustrate a particular arrangement without indicating specific dimensions.

Additional lamina of the tube 10 are shown as comprising a red colour mask 31 which overlies the shadow mask 30. Overlying the mask 31 is a green colour mask 32 and overlying that mask is a blue colour mask 33. A more detailed view of portions of the various color masks described may be seen in FIGS. 6, 7 and 8. Close inspection will reveal that each of the masks 31, 32 and 33 includes a plurality of colour windows 36, 37 and 38, respectively. When overlying the shadow mask 30, each colour window is in registration with a predetermined aperture 35. In this way, a colour triad is formed for each horizontal line comprising three conductors 12 and corresponding vertical conductor 13. The plurality of colour triads required for a picture tube are therefore easily constructed. This form of construction further simplifies picture tube construction by permitting individual ones of the colour masks to be fabricated in one colour only, thereby avoiding problems with tolerances and registration associated with single masks that include the three primary colours used in television systems.

Figure 5:
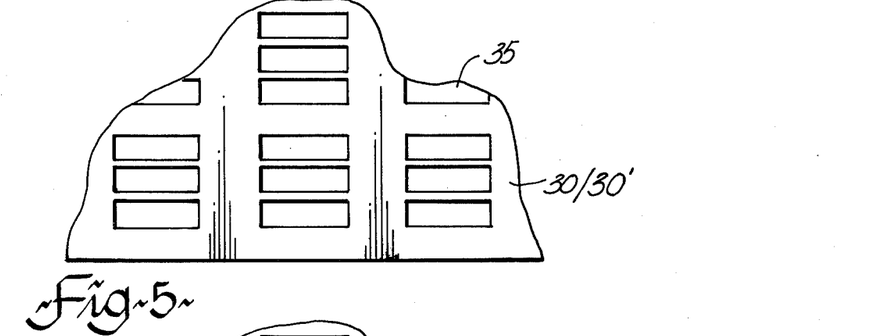
FIG. 5 is a partial front elevation view of a shadow mask shown in FIG. 2.

It should be noted in FIG. 5 that the height and width dimensions of each colour triad are equal. This is not a rigid structural consideration but it has been determined that equal vertical and horizontal dimensions of the colour triad provide good results in respect of picture definition.

Figure 6:
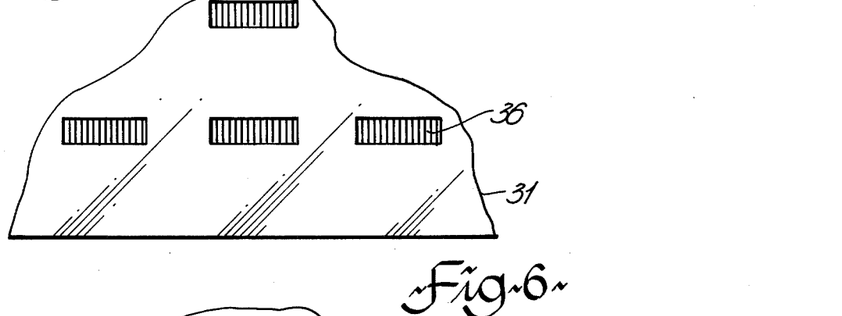
FIGS. 6, 7 and 8 are each a partial front elevation view of red, green and blue colour masks, respectively, shown in FIG. 2.
Figure 7:
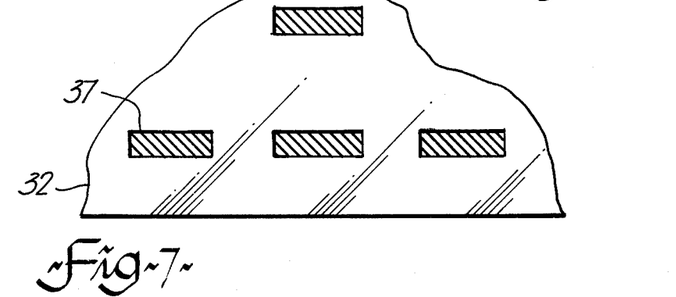
Figure 8:
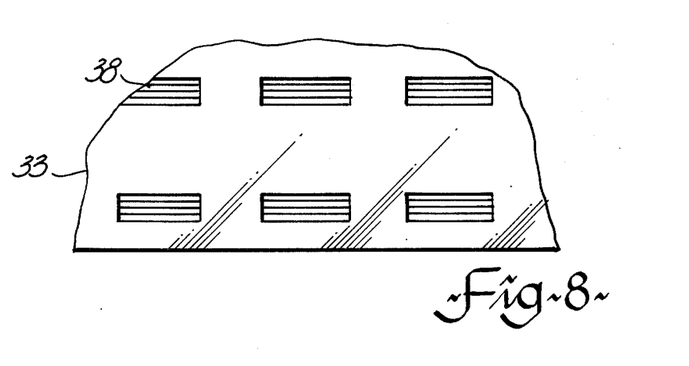

Each of the colour masks 31, 32 and 33 appearing in FIGS. 6, 7 and 8, respectively, are fabricated of an optically transparent material that is capable of tolerating the heat generated by the LEDs 14. Each colour mask has disposed on a surface thereof an array of corresponding colour windows that comprise discrete portions of fluorescent material adapted to emit light having a single primary colour. In the case of the mask 31 it will be seen that the colour window 36 is defined by a fluorescent material adapted to emit light having the colour red. In FIG. 7, the colour window 37 is defined by fluorescent material adapted to emit light having the colour green and in FIG. 8 the colour window 38 is defined by fluorescent material that emits light having the primary colour blue. In each case, the fluorescent material is activated by white light generated by a corresponding LED.

Another shadow mask 30' overlies the colour mask 33. The mask 30' is similar to the shadow mask indicated in FIG. 5 in that it is fabricated from an opaque material having apertures 35 therein which are in registry with the colour windows of the above-described colour masks. The function of this second shadow mask is to delimit each colour triad and to clearly define one from the other.

The final lamina is a transparent plate 34 which may be fabricated of glass, plastic and the like and is included simply to provide protection for the underlying substructures of the tube 10.

Figure 9:
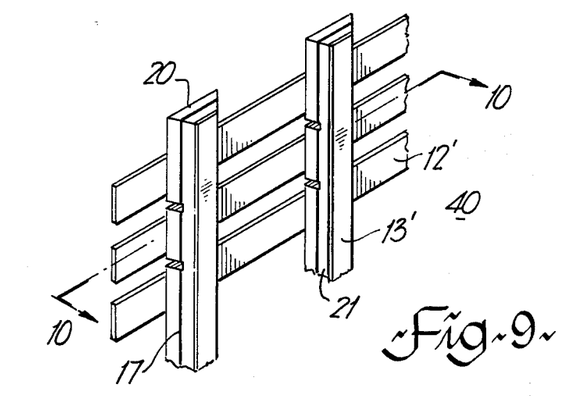
FIG. 9 is a perspective view showing a portion of a second embodiment of the matrix of FIG. 1.

FIG. 9 illustrates a portion of a matrix 40, the function of which is identical to the matrix 11. Similar to the matrix 11, the matrix 40 comprises a plurality of horizontal conductors 12' as well as vertical conductors 13'. The matrix 40 is fabricated in a manner similar to that described for the matrix 11 since chemical milling is employed. As the method is well known to those skilled in the art, a complete description should not be required.

There is one important consideration in the matrix 40 which may be seen in FIG. 9 of the drawings. This is the particular shape of the combined vertical conductor 13' and the semiconductor layers 20 and 21. It will be observed that the shape of the semiconductor layers 20 and 21 is such as to have sloping sides tapering inwardly from the horizontal conductors 12' to the vertical conductor 13'. In this way, the LED junction is exposed and is clearly visible to a viewer without obstruction. The manner in which this structural feature is obtained is by differentially etching the semiconductor materials, providing an initial high rate of etch and thereafter continually reducing the rate of etch until all of the semiconductor material is removed except for that portion underlying the vertical conductor 13' as noted above.

Figure 10:
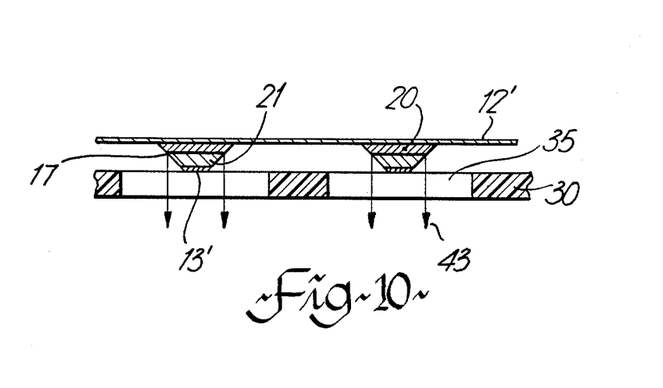
FIG. 10 is a sectional view taken along the lines 10—10 of FIG. 9.

FIG. 10 is a cross-sectional view taken along the lines 10—10 of FIG. 9 and indicates more clearly the tapered-side structure of the semiconductor layers 20 and 21 relative to the conductors 12' and 13'. Arrow lines 43 show the direction of incident light emitted by the LED junction 17 at its corresponding crosspoint. FIG. 10 also indicates the relative position of the matrix 40 and the shadow mask 30. As previously described, it will be seen that the apertures 35 are in alignment with each LED. In the structure of FIG. 10, the substrate 24 is not required since the matrix 40 may be affixed directly to one side of the mask 30 as indicated in the sectional view.

In a conventional television receiver application observing North American standards, there are a total of 525 horizontal scanning lines. Since the tube 10 of the present invention employs three horizontal conductors for each horizontal line, there are a total of 1,575 horizontal conductors required. The aspect ratio of the television system is 4;3. This ratio is maintained by using 700 vertical conductors with the aforenoted horizontal conductors. In order to scan in a stepwise manner along the horizontal conductors, the vertical conductors are energized in a stepwise manner from left to right in accordance with the above-noted television standards. A reproduced image is constructed from the plurality of colour triads disposed at the crosspoints of the horizontal and vertical conductors. Since the image is formed at a rate of 30 frames per second, the frequency of a horizontal setting oscillator, shown as a clock 50 in FIG. 12, is the product of the horizontal and vertical lines and image rate and is equal to 11,025,000 Hz.

Figure 12:
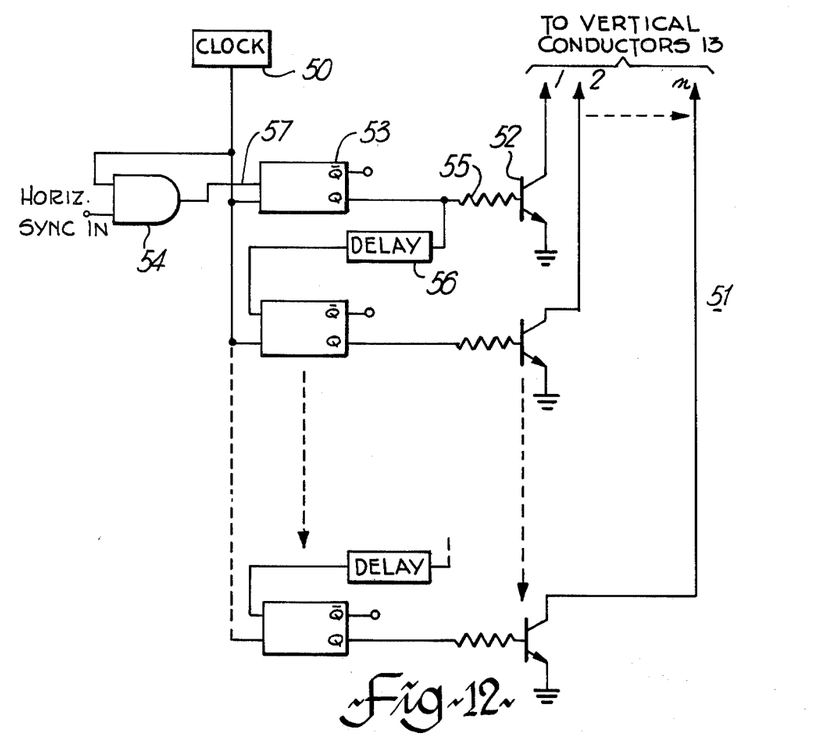
FIG. 12 is a schematic diagram of logical scanning circuitry for horizontally scanning the picture tube of FIG. 2.

The logical circuitry required to energize stepwise the vertical conductors 13 is shown in FIG. 12 as a horizontal scanning circuit 51. In order to simplify the presentation, in view of the large number of vertical conductors used, only three energizing circuits are shown, the energizing circuits for the first, second and nth vertical conductors.

The horizontal scanning circuit 51 includes a plurality of outputs, each taken from a transistor 52. In the circuit configuration shown, each transistor 52 is an NPN type. Accordingly, a positive pulse applied to the base of the transistor 52 will switch it into conduction, thus bringing the collector electrode to ground which grounds one end of the vertical conductor to which the collector is connected. Consecutive horizontal scanning occurs as individual ones of the vertical conductors 13 are taken to ground by a corresponding transistor 52 which is controlled by positive going pulses derived from the logical circuitry of the circuit 51.

The clock 50 generates pulses at the rate of 11,025,000 Hz which are used to reset flip-flops 53 and which are also applied to one input of a two-input AND gate 54. The other input to the gate 54 is supplied with horizontal sync pulses occurring at the line rate of 15,750 Hz. Accordingly, after the gate 54 is set by a clock pulse, the next horizontal sync pulse that occurs concurrently at the second input produces an output high which is applied to a trigger input 57 of the flip-flop 53. A high output Q from the flip-flop 53 is applied through a current limiting resistor 55 to the base terminal of the transistor 52. As previously discussed, the base signal is high and switches on the transistor 52 which grounds the first vertical conductor 13 for the time interval occurring between the leading edges of the horizontal sync pulse applied to the one input of the gate 54 and the next occurring clock pulse which resets the flip-flop 53.

The second and successive flip-flops 53 are triggered by the application of the Q output from the preceding flip-flop, the output being delayed by a delay circuit 56 that is coupled directly from the Q output of a preceding flip-flop 53 to the trigger input 57 of a following flip-flop. The delay time of the circuit 56 is a little longer than the clock pulse time of the clock 50 and is approximately 0.91 microseconds. Consecutive ones of the flip-flops 53 are thus triggered to operate their corresponding transistor 52 which in turn grounds one end of a corresponding vertical conductor 13. The operation continues until all of the conductors 13 are scanned. Afterwards, the scanning cycle is restarted by concurrently applying a clock pulse and a horizontal sync pulse to the inputs of the gate 54.

Figure 13:
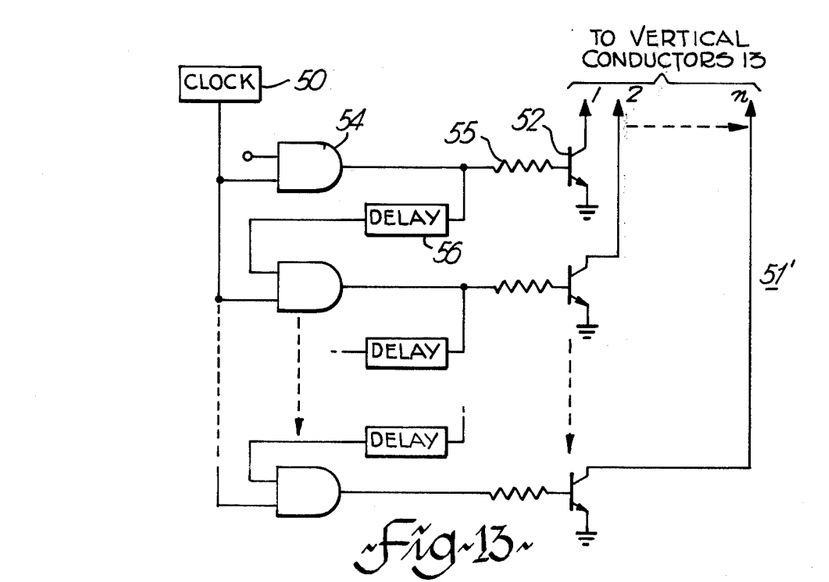
FIG. 13 is another embodiment of logical scanning circuitry for horizontally scanning the picture tube of FIG. 2.

Another embodiment of logical circuitry that may be employed to energize the vertical conductors 13 in a stepwise manner is shown as a horizontal scanning circuit 51' in FIG. 13. It will be observed that the circuit 51' is similar to that shown in FIG. 12 with the exception that all flip-flops 53 are substituted with AND gates 54. It will be noted that the remaining components of the circuit are the same and therefore the same numbering designations are used in both FIGS. 12 and 13.

Horizontal scanning of the conductors 13 is initiated when a clock pulse from the clock 50 is applied concurrently with a horizontal sync pulse to the first AND gate 54. The simultaneous occurrence of both input signals produces a high output which is applied through the limiting resistor 55 to the base of the transistor 52 which, in turn, switches on to ground the first vertical conductor 13. The high output of the AND gate 54 is then applied through a delay circuit 56 to a second AND gate 55 which operates when both inputs are high. The second AND gate then produces a high output which is applied through the limiting resistor 55 to the base of the second output transistor 52, switching it on and grounding one end of the second vertical conductor 13.

The remaining vertical conductors are consecutively energized by means of the delay circuits 56 as described until all vertical conductors are scanned in the course of a single scanning or sweep cycle. The cycle is then repeated by the simultaneous application of a clock pulse and a horizontal sync pulse applied to the inputs of the first gate 54.

Figure 11:
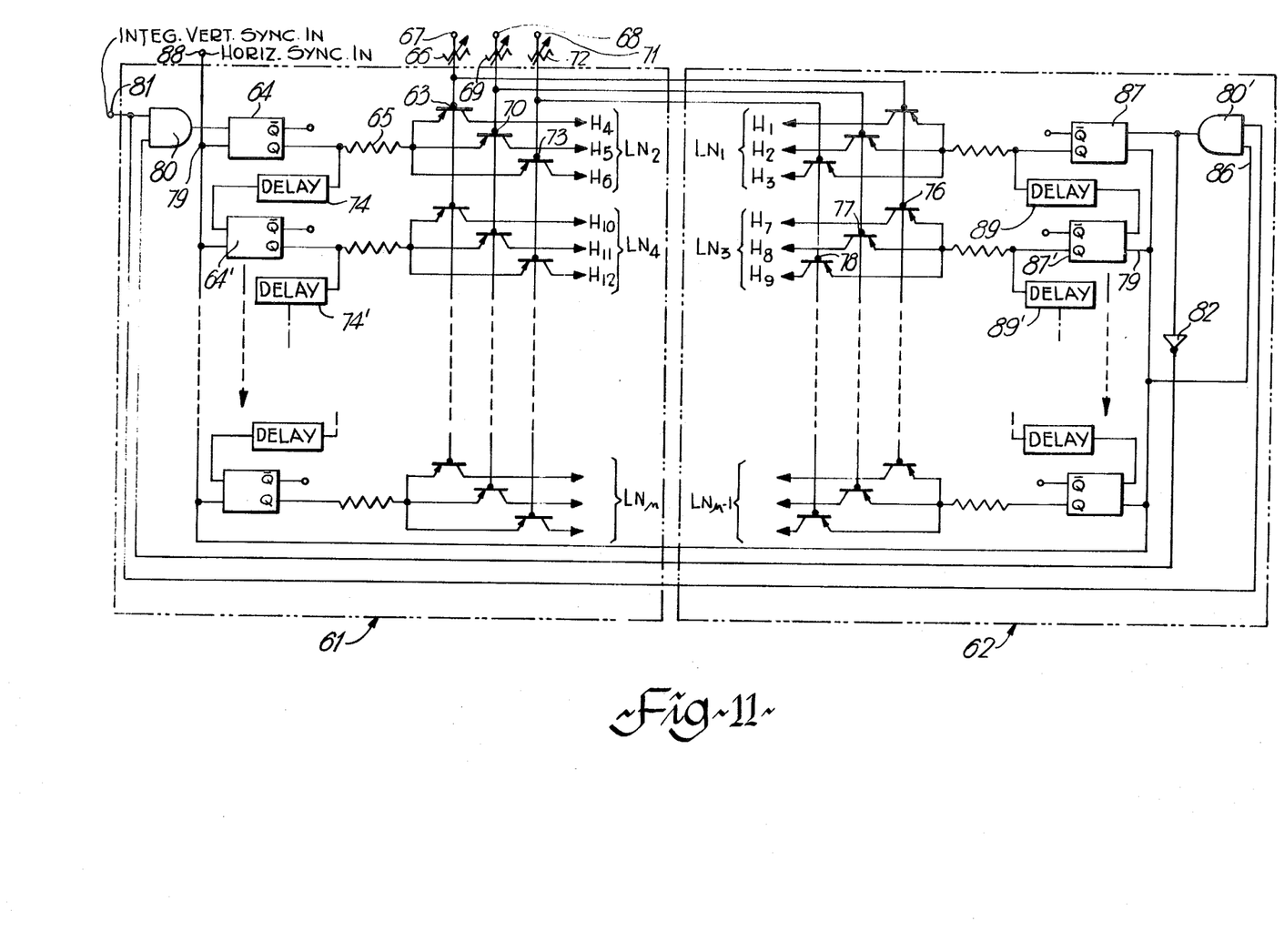
FIG. 11 is a schematic diagram of logical scanning circuitry for vertically scanning the picture tube of FIG. 2.

Referring now to FIG. 11, there will be seen a schematic diagram of a first vertical scanning circuit 61 together with a second vertical scanning circuit 62. Each scanning circuit operates one-half of the horizontal conductors 12 that comprise the horizontal scanning lines of the reproduced image. The circuits are thus arranged so that the vertical scanning circuit 61 drives all the horizontal conductors representing the scanning lines in the even field of a televised image and the circuit 62 drives all the horizontal conductors representing the scanning lines in the odd field of the image. Reference to FIG. 11 shows that the circuit 61 has outputs coupled to the even numbered lines which are represented as lines LN2, LN4 . . . LNn. Also, it will be noted that the circuit 62 is similarly constructed with its outputs connected to the lines representing the odd field, the lines being indicated as LN1, LN3 . . . LNn-1.

The horizontal lines of each field each comprise three horizontal conductors 12, with each conductor representing a primary colour which is either red, green or blue. Since the circuit arrangement of each vertical scanning circuit is similar, an understanding of the operation of one horizontal line will indicate how the entire circuit arrangement functions to energize the tube 10.

The operation of each scanning circuit 61 and 62 involves consecutively energizing the horizontal lines that form each field. This operation requires energizing consecutively each conductor 12 forming part of each line. In a manner similar to the horizontal scanning circuits, each vertical scanning circuit employs a transistor driver stage for each horizontal line having a transistor with its collector connected to the line. In the circuit 61 it will be seen that the transistor 63 is connected to the fourth horizontal conductor 12 which is indicated as $H_4$. The transistor 63 is a PNP type and functions in a complimentary manner with a corresponding transistor 52 of the horizontal scanning circuit 51 of FIGS. 12 and 13 to energize a particular crosspoint of the matrix. Assuming that the corresponding vertical conductor 13 is grounded through its transistor 52, the transistor 63 has its collector taken to ground through the LED at the particular crosspoint concerned and the transistor 52. A high output from a flip-flop 64 is applied to the emitter of the transistor 63 through a limiting resistor 63 and turns on the transistor. Colour signal information is then applied to the base of the transistor 63 through a variable control 66 that is shown schematically as being interposed between a red input terminal 67 and the base of the transistor 63. In similar fashion, a green input terminal 68 is connected through a variable control 69 to the base of a transistor 70, and a blue input 71 is connected through a variable control 72 to the base of a driver transistor 73. Assuming that each of the transistors 63, 70 and 73 are energized as described in the case of the transistor 63, colour signal information applied to each base in the form of a variable bias current will vary the current through the driver transistor to vary the luminosity of the LED at the corresponding crosspoint.

The logical circuit portion of the vertical scanning circuits 61 and 62 operates in a manner similar to that described for the horizontal scanning circuit 51. Unlike the circuit 51, in which the clock 50 produces a pulse train of reset signals, the circuits 61 and 62 include an input 88 to which is applied horizontal sync pulses that reset inputs 79 of the flip-flops 64 in the vertical scanning circuit 61 for the even field, and flip-flops 87 in the vertical scanning circuit 62 for the odd field. Considering firstly the circuit 62, it will be seen that a flip-flop 87 is provided for each horizontal line of the odd picture field. An output high from each flip-flop 87 is applied to the emitters of its corresponding driver transistors and provides the necessary operating voltages therefor. Concurrently, the high output from the flip-flop 87 is coupled through a delay circuit 89 to a trigger input of the next following flip-flop 87'. The circuit 89 functions to provide an appropriate delay between the onset of each horizontal scan. This delay is required to scan a horizontal line before initiating a scan for the following line in accordance with North American television standards. A concurrent high input on the reset and trigger inputs of the flip-flop 87' produces a high output at an output terminal Q thereof which is then applied to the emitters of transistors 76, 77 and 78. A delay circuit 89' functions in the same manner as the delay circuit 89 and scanning of each horizontal line occurs consecutively until all lines in the field are scanned. Since the logic circuitry shown for the vertical scanning circuit 62 is substantially the same as that for the circuit 61, it will be seen that the theory of operation of one applies to the other.

The flip-flop 87 is triggered, following reset by a horizontal sync pulse from the input 88 which is applied to a reset terminal 79, by means of a high input derived from a two input AND gate 80'. A first input 81 leading to the gate 80' is connected to a vertical integrator, not shown, in order to obtain an integrated vertical sync input signal. A second input 86 of the gate 80' has applied thereto the above-noted horizontal reset pulses derived from horizontal sync pulse information received from an off-air television signal. Initiation of vertical scanning in the circuit 62 occurs therefore since at the beginning of the odd frame both horizontal and vertical sync signals appear simultaneously. Thus, at the beginning of odd field scanning, two high inputs are available at the AND gate 80' to produce an output high that is applied to the trigger input of the flip-flop 87.

Following the end of odd field scanning and the beginning of the even frame, only vertical sync pulses are present at one of the two inputs to the AND gate 80'. As a result, the output of the gate 80' is low and does not trigger the flip flop 87. It will be noted, however, that the output low is inverted by an inverter 82 to produce an output high which is applied to a second input of a two input AND gate 80 of the circuit 61. Since the first input 81 of the gate 80 has concurrently applied thereto a vertical sync pulse, both inputs are high which produces an output high that is applied to the trigger input of the flip-flop 64. Thereafter, the driver transistors for the lines of the even field, listed as $LN_2$, $LN_4$ ... $LN_n$, are consecutively energized by the flip-flops 64 in the manner described for the odd field.

The foregoing description of the various embodiments of the present invention are related to a solid state picture tube that is particularly adapted for colour operation. It will be understood by those skilled in the art that the embodiments described and illustrated may be readily and conveniently adapted to monochromatic operation by the simple expedient of using fewer conductors in the matrix to which reference has already been made. Furthermore, in a monochromatic form of operation the colour inputs would not be required although corresponding inputs would be needed for the monochromatic signal.

It will also be apparent to those skilled in the art that the preceding description of the embodiments of the invention may be substantially varied to meet specialized requirements without departing from the spirit and scope of the invention disclosed. The foregoing embodiments are therefore not to be taken as limiting but rather as exemplary structures of the invention which is defined by the claims.

What I claim is:

1. A digital scanning colour television video screen having a plurality of conductors arranged in a matrix forming a plurality of crosspoints with each crosspoint including a separate source of light energizable via the matrix to form an image, the screen comprising:
   a plurality of horizontal conductors arranged in groups of three conductors each, said groups being disposed vertically across the screen in uniformly spaced relation with each group corresponding to a single horizontal scan line;
   a plurality of vertical conductors disposed horizontally across the screen in uniformly spaced relation to form the matrix, the intersection of the conductors of each horizontal scan line with a single vertical conductor forming a vertically disposed plurality of crosspoint triads;
   light-emitting diode means connected across each crosspoint, each said means having a junction that is energizable via the matrix to emit white light and which is disposed relative to its crosspoint to provide an unobstructed path for incident light emitted by said junction; and tricolour faceplate means having disposed thereon a plurality of colour triads corresponding to the crosspoint triads and aligned in overlying registry therewith.

2. A video screen as claimed in claim 1 further comprising:

horizontal digital scan means having a plurality of digital outputs of which individual ones are connected to corresponding ones of vertical conductors in said matrix to consecutively energize the vertical conductors in response to predetermined horizontal synchronizing pulse signals; and vertical digital scan means having a plurality of digital outputs of which individual ones are connected to corresponding ones of horizontal conductors in said matrix to consecutively energize the horizontal conductors in response to predetermined vertical synchronizing pulse signals whereby the resulting scan consecutively energizes all the crosspoints in a predetermined order.

3. A video screen as claimed in claim 2 further comprising a shadow mask having a plurality of apertures, individual ones of which are aligned in registry with corresponding ones of light-emitting diode means to direct the light therefrom outwardly of the matrix.

4. A video screen as claimed in claim 3 wherein each colour triad comprises a photon activated fluorescent material adapted to emit light having additive primary colours of red, green and blue.

5. A video screen as claimed in claim 4 wherein said faceplate means comprise three overlying transparent lamina, each one of said lamina having disposed on a surface thereof an array of discrete portions of fluorescent material adapted to emit light having a single primary colour.

6. A video screen as claimed in claim 5 further comprising a second shadow mask corresponding to said first shadow mask and overlying said lamina to delimit each colour triad.

* * * * *